United States Patent [19]
Salzburg

[11] Patent Number: 5,863,431
[45] Date of Patent: Jan. 26, 1999

[54] DISPOSABLE FILTER WITH INDICIA

[76] Inventor: Diana Salzburg, 230 E. 73rd St., New York, N.Y. 10021

[21] Appl. No.: 691,207

[22] Filed: Aug. 1, 1996

Related U.S. Application Data

[63] Continuation of Ser. No. 529,099, Sep. 15, 1995, abandoned.
[51] Int. Cl.⁶ .................................................. B01D 29/085
[52] U.S. Cl. .......................... 210/474; 210/477; 210/482; 206/0.5; 99/295; 426/77; D7/300; D7/309; D7/400
[58] Field of Search ...................... 210/474, 477, 210/482; 206/0.5; 99/295, 304; 426/77, 82, 79, 87; D7/303, 309, 310, 400, 300

[56] References Cited

U.S. PATENT DOCUMENTS

| | | |
|---|---|---|
| 676,763 | 6/1901 | Nelson . |
| 2,093,980 | 9/1937 | Linger . |
| 2,126,584 | 8/1938 | Small . |
| 2,513,593 | 7/1950 | Smith . |
| 2,758,771 | 8/1956 | Bauer . |
| 3,930,086 | 12/1975 | Harmon .................................. 428/131 |
| 4,078,356 | 3/1978 | Gallo et al. .............................. 426/410 |
| 4,801,464 | 1/1989 | Hubbard, Jr. .............................. 426/79 |

*Primary Examiner*—W. L. Walker
*Attorney, Agent, or Firm*—Sofer & Haroun, LLP

[57] ABSTRACT

A water permeable disposable filter, the filter including a side wall having an open top region and a sealed bottom region with indicia means is provided. The filter is provided with interior and exterior surfaces, the indicia means located on the interior surface of the side wall of the filter for indicating the amount of ground coffee to be filled into said filter in order to produce a desired quantity of the brewed coffee beverage. The indicia means may include both numbering and level graduations.

8 Claims, 3 Drawing Sheets

DISPOSABLE FILTER WITH INDICIA

This is a continuation of U.S. application Ser. No. 08/529,099, filed Sep. 15, 1995, which now abandoned.

FIELD OF THE INVENTION

This invention relates to a permeable filter for filtering ground coffee, wherein the side wall of the filter is provided with indicia means for determining the amount of ground coffee needed to be added in order to produce a desired amount of brewed coffee.

BACKGROUND OF THE INVENTION

Freshly brewed coffee has numerous advantages to instant coffee. For example, brewed coffee, when made from freshly ground beans, has a superior aroma and taste compared with instant coffee. However, a problem is encountered when measuring or determining the amount of ground coffee needed in order to make a desired amount of fresh brewed coffee. Until this time, one accepted technique of providing the correct amount of ground coffee was to measure with a measuring device, ie. spoon, tablespoon, scoop, cup etc, the necessary amount of ground coffee needed and to place this amount within the filter of the coffee machine. In this way, as well as through trial and error, the coffee connoisseur would determine the dry measure of coffee grounds needed to make a specific quantity of brewed coffee noting whether the brewed coffee was too weak or strong for the particular taste.

As an alternative to such indiscriminate measuring, ground coffee is also packaged in individual "one-shot" packets which are proportionate to the volume of a standard sized coffee pot. In this way, the user opens the individual packet of ground coffee and pours it into the filter which is placed in the filter basket of the coffee machine. However, when an amount of brewed coffee is needed which is less than the standard amount, such as one or two cups, there is no accurate way of measuring how much coffee is needed to make the needed one or two cups of coffee. Another drawback to such individual packaged ground coffee is that such "one-shot" packets are typically more expensive as compared with the ground coffee found in large volume coffee tins. Another drawback is that not all coffee brands and/or flavors are found in such "one-shot" packets.

Many attempts have been made to overcome the problems associated with accurately determining the amount of ground coffee needed to make a desired amount of brewed coffee. However, prior art coffee filters and prior art coffee machines have suffered from a variety of drawbacks and deficiencies. For example, U.S. Pat. No. 676,763 to Nelson discloses a coffee boiler receptacle having an internal metal ribbed ground coffee cylinder into which ground coffee is deposited. The numbers present on the cylinder indicate the distance from the bottom to the level of the stated number of cups of water within the receptacle. This reference does not teach or suggest a water permeable disposable filter, the filter including a side wall having an open top region and a sealed bottom region with indicia means on the interior surface of the side wall of the filter for indicating the amount of ground coffee to be filled into said filter in order to produce a desired quantity of the brewed coffee beverage.

U.S. Pat. No. 2,093,980 to Linger discloses a electric teapot having a scale graduated in teaspoons whereby a predetermined measured quantity of tea may be inserted in the container without resorting to a measuring device. As well, this reference does not teach or suggest a water permeable disposable filter, the filter including a side wall having an open top region and a sealed bottom region with indica means on the interior surface of the side wall of the filter for indicating the amount of ground coffee to be filled into said filter in order to produce a desired quantity of the brewed coffee beverage.

U.S. Pat. No. 2,126,584 to Small shows a coffee pot provided with graduations which indicate the depths to which the receptacle should be filled with coffee grounds for a given number of cups of coffee to be made. Likewise, this reference does not teach or suggest a water permeable disposable filter, the filter including a side wall having an open top region and a sealed bottom region with indica means on the interior surface of the side wall of the filter for indicating the amount of ground coffee to be filled into said filter in order to produce a desired quantity of the brewed coffee beverage.

U.S. Pat. No. 2,513,593 to Smith discloses a coffee maker having a graduated indicator rod for determining the proper quantity of ground coffee to be poured into the vessel to make the required number of cups of liquid coffee. Similarly, this reference does not teach or suggest a water permeable disposable filter, the filter including a side wall having an open top region and a sealed bottom region with indica means on the interior surface of the side wall of the filter for indicating the amount of ground coffee to be filled into said filter in order to produce a desired quantity of the brewed coffee beverage.

U.S. Pat. No. 2,758,771 to Bauer disclosed a disposable measuring cup formed of a waxed paper, the measuring cup having graduations for determining the amount of ingredients to be poured from the disposable cup. Accordingly, his reference does not teach or suggest a water permeable disposable filter, the filter including a side wall having an open top region and a sealed bottom region with indica means on the interior surface of the side wall of the filter for indicating the amount of ground coffee to be filled into said filter in order to produce a desired quantity of the brewed coffee beverage.

OBJECTS AND SUMMARY OF THE INVENTION

It is therefore an object of the invention to provide a water permeable paper filter having an indicia means on the inside surface of the filter so that a user may fill the filter with ground coffee to a predetermined level in order to produce a desired amount of brewed coffee without resorting to extraneous measuring devices.

It is a further object of the invention to provide an embossed indicia means such as an embossed vertical graduated scale or calibration as well as numbers which correspond to the calibration on the side of the filter so that an accurate amount of ground coffee may be deposited within the filter.

An additional object of the invention is to provide a printed indicia means such as a vertical graduated scale on the side of the filter, the vertical scale being printed with an acceptable food dye so that an accurate amount of ground coffee may be deposited within the filter.

A further object is to provide a filter which conforms to the shape of the coffee brewing basket of the coffee brewing machine, such filter being either a cone shaped filter or basket shaped filter thereby accommodating standard types and sizes of both electric and regular drip coffee brewing machines.

In accordance with the present invention, a coffee machine or brewing means for brewing the ground coffee beans is provided. Any type of brewing means known to one of ordinary skill in the art may be utilized such as electric or regular drip coffee machines. Typically, such brewers include a water holding compartment, a heating or boiling compartment, and a brewing compartment. The water holding compartment may be substantially sealed by a removable cover. The brewing compartment or receptacle contains a filter holder or basket which holds a permeable paper coffee filter which may be cup or basket shaped. The filter is provided with an indicia means in the form of a graduated vertical scale graduated so that the filter may be filled with the coffee grounds to a predetermined level in order to produce a desired amount of brewed coffee without resorting to extraneous measuring devices. The indicia means may be embossed on the inside surface of the filter or printed on the inside or outside surfaces of the filter with a suitable food dye. Other types of coffee pots may be utilized with the present invention such as hour glass non-mechanical types. Typically, these non-mechanical types are provided with a coffee pot which supports a filter holder, a filter and ground coffee, the filter holder resting on the coffee pot brim. Hot water, which is heated in another receptacle, is poured directly through.

The indicia means may include numbers, calibrations or both. The numbers could be in various combinations, ie. 1, 2, 3 or 2, 4, 6, and thus would indicate to the user how many cups of coffee the dry measure of ground coffee would yield. Calibrations or horizontal lines may be located proximate the numbers to provide the user with a visual indication of when to stop pouring ground coffee into the filter once the level of ground coffee reaches the desired calibration. The numbers and calibrations would conform to the varying sizes of the filters.

Additionally, the calibrations and numbers which may be found on the inside or outside of the filter are readable, when the filter is in an open position. More than one set of numbers and calibrations may be found on one or both sides of the filter. For example, different calibrations for drip coffee makers and for electric drip coffee makers may be utilized on the same filter so that the filter may be used in both electric and drip coffee makers. Additionally, different strength calibrations may be utilized to provide the user with the ability to vary the strength or weakness of the coffee.

The filter is used as follows. The filter is placed in the filter holder or basket. Next, in order to make a specific amount of brewed coffee, for example four cups, coffee grounds are placed in the filter up to the four cup calibration on the inside surface of the filter. Four cups of water which corresponds to the amount of coffee grounds placed within the filter are poured into the water holding compartment of the coffee machine or are poured through the filter. Accordingly, the water holding compartment is filled with a variable quantity of water, depending on the amount of coffee grounds deposited in the coffee filter. In the heating compartment, electrical heating means is provided which imparts heat to the water for brewing the water to a desired temperature. Discharge means in the form of a conduit or tube is located in the heating compartment and has one end in communication with the water within the holding compartment and its other end in communication with the brewing compartment which is at atmospheric pressure. The heated water is introduced into the brewing compartment and allowed to contact the ground coffee. An outflow aperture is dimensioned and arranged to permit discharge of brewed coffee therefrom and into a carafe positioned beneath the brewing compartment. The outflow aperture may include a filter valve stopper which is mounted in a position wherein the filter valve stopper acts to seal the aperture. When the carafe is positioned beneath the filter stopper valve, the filter valve lever is caused to pivot thus opening the filter valve stopper allowing the brewed coffee to drip into the carafe. Accordingly, four cups of coffee are brewed.

Other objects and features of the invention will become apparent from the following detailed description considered in conjunction with the accompanying drawings. It is to be understood, however, that the drawings are designed solely for purposes of illustration and not a definition of the limits of the invention, for which reference should be made to the appended claims.

BRIEF DESCRIPTION OF THE DRAWINGS

The preferred embodiment of the invention will be explained in further detail and in reference to the drawings, in which.

DETAILED DESCRIPTION OF THE PRESENTLY PREFERRED EMBODIMENTS

Figure 1:
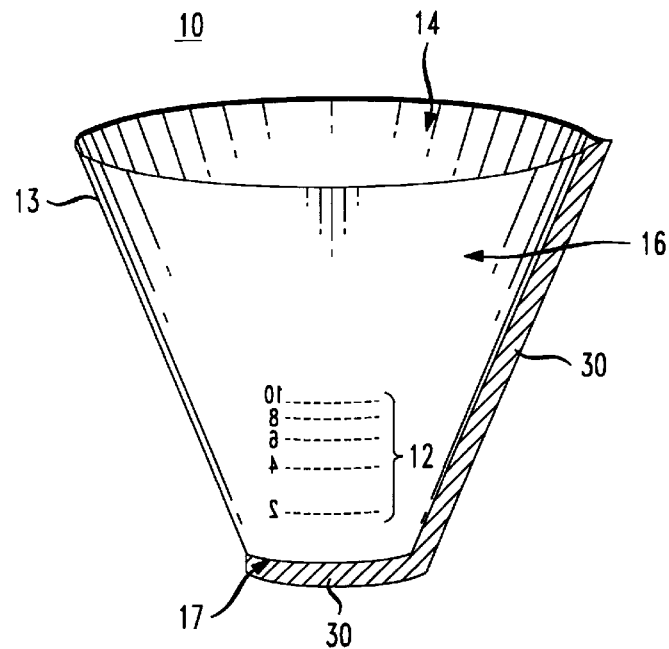
FIG. 1 is a perspective view of a coffee filter constructed in accordance with an illustrative embodiment of the present invention.

Referring now to the drawings for a more detailed description of the present invention and more particularly to FIG. 1 thereof, a cup shaped filter 10 is shown. The cup shaped filter is provided with a side wall 13 having an interior surface 14, an exterior surface 16 and a bottom region 17. An indicia means 12 is provided on the interior surface 14 of the cup shaped filter 10. In this embodiment, the indicia means 12 is embossed on the inside surface 14 of the filter 10 and is thus shown in reverse in FIG. 1. When viewing the indicia means 12 from the top of the filter 10, it is shown in its normal position on the inside surface 14 of the filter 10.

In FIG. 1, the filter 10 is shown in a cup shaped form although any shape or structure which is suitable as a filter may be utilized. Additionally, the filter 10 may be constructed out of any suitable filtering media, such as paper, paper fiber material, cloth, or any material that is permeable thus allowing the liquid to filter through the filtering media while retaining the coffee grounds. A cup shaped filter 10 may be provided as well as a basket shaped filter 22, as shown in FIG. 2B, depending on the type of coffee brewing means such as an electric drip brewer or a regular drip brewer. Accordingly, any shape or form of a filter may be used with this invention, the invention not being limited to the shape, or form of the filter. Basket shaped filter 22 is also provided with a bottom region 17 which is not sealed but is formed of a one-piece construction with the side wall 13.

Figure 2A:
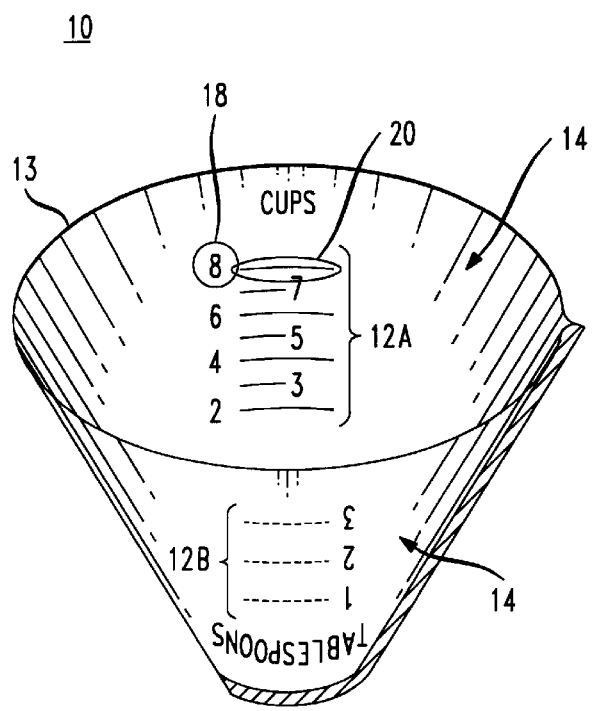
FIG. 2A is a top view of the opened filter of the filter shown in FIG. 1.
Figure 2B:
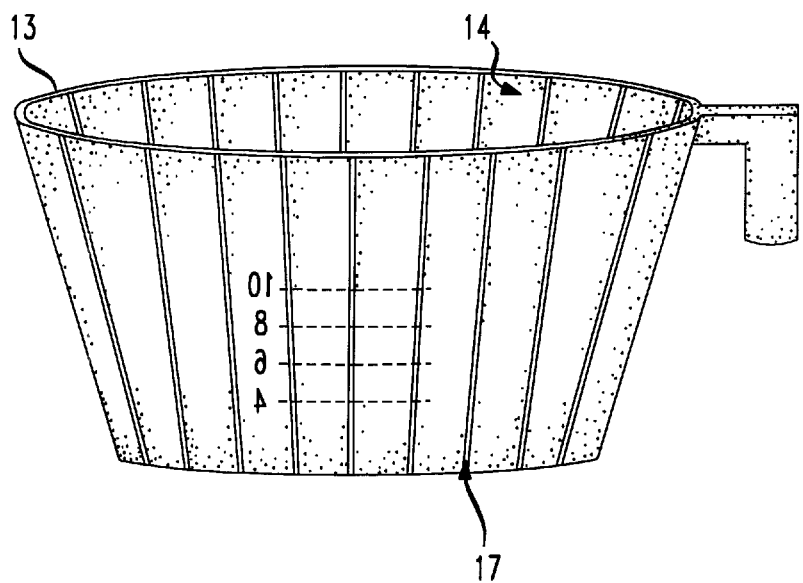
FIG. 2B is a side view of an further filter embodiment of the invention.

With reference to FIG. 2A, one or more indicia means 12A, 12B may be provided on the interior surface 14 of the cup-shaped filter 10. For example, the indicia means 12A may be provided in the form of a vertical scale graduated in cups so that the cup shaped filter 10 may be filled with coffee grounds to a predetermined level in order to produce a desired amount of brewed coffee without resorting to extraneous measuring devices. Referring to indicia means 12B, the vertical scale may be graduated in another measure such as tablespoons so that the user may know how much ground coffee is deposited in the filter 10.

As shown in FIG. 1, the indicia means 12 may be blind embossed onto the paper or cloth filter 10 thus providing a raised or depressed surface when looking into the open top of the filter 10. Additionally, the indicia means 12 may be printed with an acceptable food dye, vegetable dye or any other approved safe dye, on either the inside surface 14 or the exterior surface 16 of the filter 10. When a cloth filter 10 is utilized, the indicia means 12 may be sewn onto the side wall 13 of the cloth filter 10 on either the inside 14 or outside 16 surfaces.

Referring to the indica means 12, 12A and 12B shown in FIGS. 1 and 2A, the indicia means may be numbers, calibrations or both. As shown in FIG. 2A, the indicia means 12A includes numbers 18 located proximate the calibrations 20 which indicate the number of cups that may be brewed by filling the filter 10 with ground coffee to this level. Next to each number is a calibration or horizontal line 20 which provides the user with a visual indication of the level to which the dry measure of ground coffee need be added in order to brew the desired amount of coffee shown in the corresponding number 18. As is evident, the numbers 18 may be in various combinations 1, 2 and 3 or 2, 4, and 6 and thus would indicate to the user how many cups of coffee the dry measure of ground coffee would yield. As is evident to one skilled in the art, one or more sets of calibrations and numbers may be provided on any side of the permeable filter 10 to provide the user with the ability to vary the strength or weakness of the coffee. As well, the numbers and calibrations would conform to varying sizes of the filters.

Figure 3:
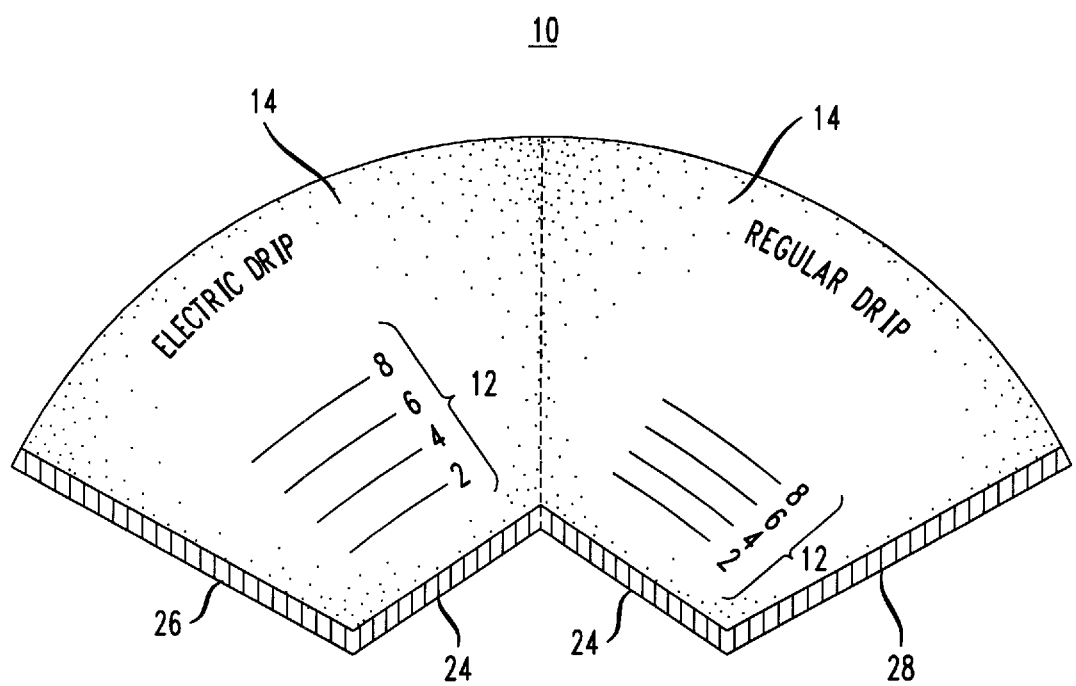
FIG. 3 is a view of the filter as shown in FIG. 1 in an uncrimped position.

Referring to FIG. 3 which shows the filter 10 in an unsealed or uncrimped position, the filter 10 may be formed of a single sheet of paper material and prior to crimping may be printed or embossed with the indicia means 12. Accordingly, a means for joining a first side edge 26 and a second side edge 28 of the filter is also provided. The formation of the filter 10 and the embossing of the filter 10 may also be a one step process in which bottom edge 22 is joined or crimped with bottom edge 24, first side edge 26 is joined or crimped with second side edge 28 and indicia means 12 is embossed on the side edge 14 thus forming crimped seam 30 as shown in FIG. 1. In this embodiment, the same embossing or crimping apparatus may be used to form the crimped seam 30 and to form the indicia means 12. Alternatively, bottom edge 22 may be glued to bottom edge 24 with first side edge 26 being glued to second side edge 28.

Figure 4:
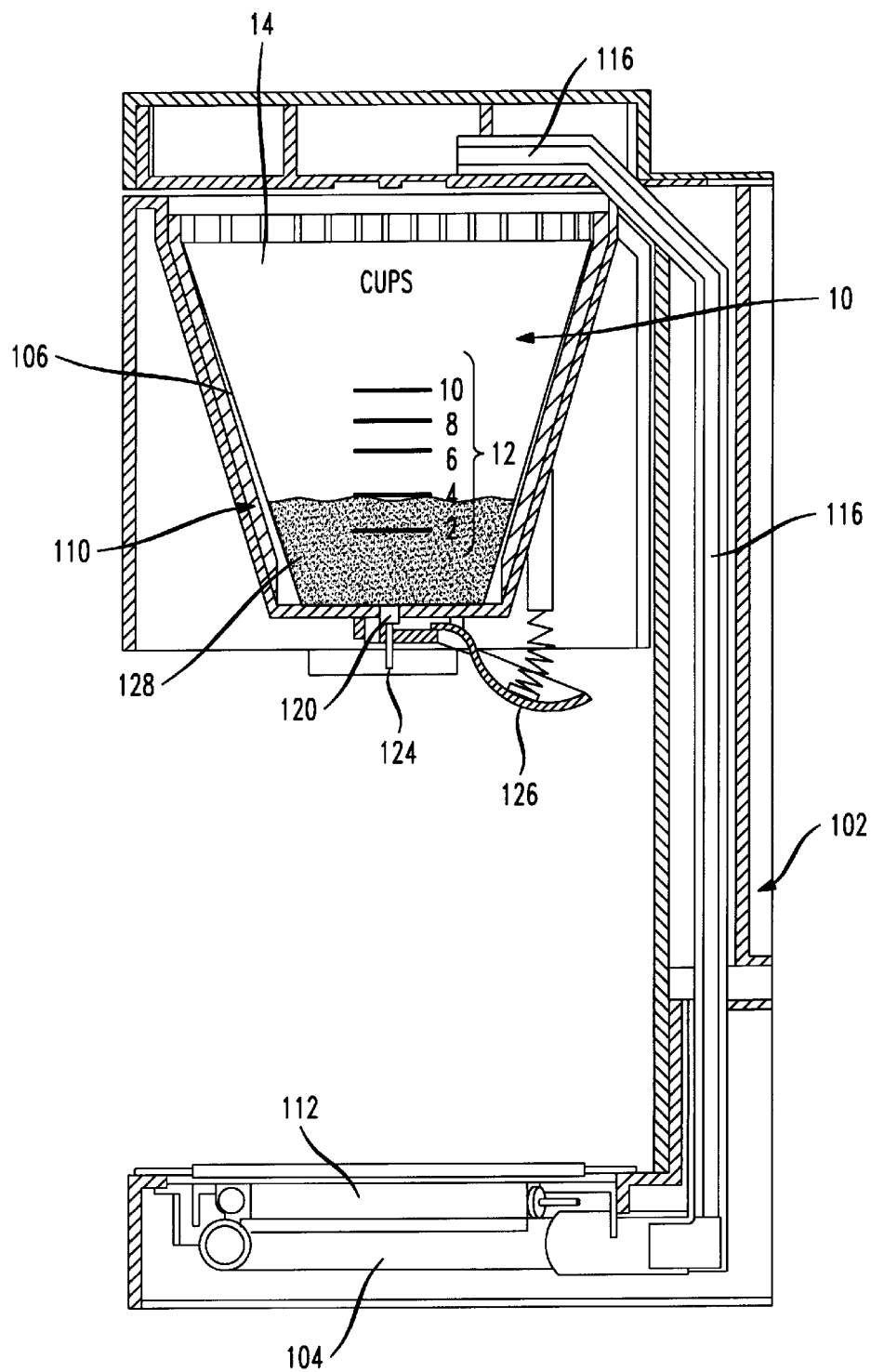
FIG. 4 is a cross sectional view of a coffee brewing machine showing a filter holder and filter.

Referring to FIG. 4, a coffee brewer or brewing means 100 for brewing the ground coffee beans is provided. Any type of brewing means 100 known to one of ordinary skill in the art may be utilized such as electric or regular drip coffee machines. Typically, such brewers 100 include a water holding compartment 102, a heating or boiling compartment 104, and a brewing compartment 106. The water holding compartment 102 may be substantially sealed by a removable cover (not shown). The brewing compartment 106 contains a filter holder 110 which holds a permeable paper coffee filter 10 shown in this embodiment as being cup-shaped. The cup shaped filter 10 is provided with a vertical scale 12 graduated in cups so that the cup shaped filter 10 may be filled with the coffee grounds 128 at a predetermined level in order to produce a desired amount of brewed coffee without resorting to extraneous measuring devices. The vertical scale 12 may be embossed onto the inside surface 14 of the filter 10 or printed on the inside surface 14 with a suitable dye.

Referring again to FIG. 4, the water holding compartment 102 is filled with a variable quantity of water, depending on the amount of coffee grounds 128 deposited in the coffee filter 10. In the heating compartment 104, electrical heating means 112 is provided which imparts heat to the water to brew the water to a desired temperature. Discharge means 116 in the form of a conduit or tube is located in the heating compartment 104 and has one end in communication with the water within the holding compartment 102 and its other end in communication with the brewing compartment 106 which is at atmospheric pressure. The heated water is introduced into the brewing compartment 106 and allowed to contact the ground coffee 128. An outflow aperture 120 is dimensioned and arranged to permit discharge of brewed coffee therefrom and into a carafe (not shown) positioned beneath the brewing compartment 106. The outflow aperture 120 may include a filter valve stopper 124 which is mounted in a position wherein the filter valve stopper 124 acts to seal the aperture 120. When the carafe is positioned beneath the filter stopper valve 124, the filter valve lever 126 is caused to pivot thus opening the filter valve stopper 124 allowing the brewed coffee to drip into the carafe.

It should be understood that the preferred embodiments and examples described are for illustrative purposes only and are not to be construed as limiting the scope of the present invention which is properly delineated only in the appended claims.

What is claimed is:

1. A filter liner for filtering ground coffee to produce a brewed coffee beverage, said liner comprising:

a water permeable disposable paper filter, said paper filter having a side wall, an open top region and a bottom region, said side wall of said filter having first and second side edges joined together by crimping said first and second side edges together in order to form a continuous crimped side wall of said filter; and visible indicia means on the surface of said side wall for indicating the amount of ground coffee to be filled into said filter in order to produce a desired quantity of the brewed coffee beverage, wherein said indicia means is embossed on the surface of said side wall of said filter and said indicia means is viewable on said filter.

2. The filter liner of claim 1, wherein said indicia means is located on the interior surface of said side wall of said filter.

3. The filter liner of claim 1, wherein said water permeable disposable filter is cone shaped.

4. The filter liner of claim 1, wherein said water permeable disposable filter is formed in the shape of a basket.

5. The filter liner of claim 1 further comprising second indicia means opposite said first indicia means for indicating the amount of ground coffee to be filled into said filter in order to produce a desired quantity of the brewed coffee beverage.

6. The filter liner of claim 1, wherein said bottom region is provided with first and second bottom edges joined together by crimping said first and second bottom edges together in order to form a continuous crimped bottom region.

7. A filter liner for filtering ground coffee to produce a brewed coffee beverage, said liner comprising:

a water permeable disposable paper filter, said paper filter having a side wall, an open top region and a bottom region, said side wall of said filter having first and second side edges joined together by crimping said first and second side edges together in order to form a continuous crimped side wall of said filter; and visible indicia means on the surface of said side wall for indicating the amount of ground coffee to be filled into said filter in order to produce a desired quantity of the brewed coffee beverage, wherein said indicia means is printed on the surface of said side wall of said filter and said indicia means is viewable on said filter.

8. The filter liner of claim 7, wherein said indicia means is printed with a dye, said dye being visible to the naked eye.

* * * * *